United States Patent [19]

Fuchs

[11] 4,330,403
[45] May 18, 1982

[54] APPARATUS FOR PURIFYING POLLUTED LIQUIDS

[76] Inventor: Hubert Fuchs, Im Stockthal, 5440 Mayen, Fed. Rep. of Germany

[21] Appl. No.: 249,426

[22] Filed: Mar. 31, 1981

Related U.S. Application Data

[63] Continuation of Ser. No. 74,753, Sep. 12, 1979, abandoned.

[30] Foreign Application Priority Data

Sep. 25, 1978 [DE] Fed. Rep. of Germany ....... 2841700

[51] Int. Cl.³ .............................................. C02F 1/22
[52] U.S. Cl. ................................. 210/221.2; 209/170
[58] Field of Search .............. 210/608, 703, 704, 705, 210/706, 707, 776, 800, 804, 221.1, 221.2, 513, 525, 532.1, 533, 534, 541; 209/168, 169, 170

[56] References Cited

U.S. PATENT DOCUMENTS

| 2,237,172 | 4/1941 | Briggs | 210/525 |
|---|---|---|---|
| 2,305,929 | 12/1942 | Lund | 210/525 |
| 2,778,499 | 1/1957 | Chamberlain | 210/704 |
| 2,813,074 | 11/1957 | Banks | 210/703 |
| 2,880,876 | 4/1959 | Dujardin | 210/523 |
| 2,920,763 | 1/1960 | Lind | 210/221.1 |
| 3,301,779 | 1/1967 | Kovacs | 210/705 |
| 3,745,113 | 7/1973 | Fuchs | 210/608 |
| 4,028,249 | 6/1977 | McGiven | 210/242.1 |
| 4,169,047 | 9/1979 | Wilson | 210/221.2 |

FOREIGN PATENT DOCUMENTS

| 1782485 | 2/1972 | Fed. Rep. of Germany . |
| 2442143 | 10/1975 | Fed. Rep. of Germany ... 210/221.2 |

Primary Examiner—Ernest G. Therkorn
Attorney, Agent, or Firm—Burgess, Ryan and Wayne

[57] ABSTRACT

The invention is an apparatus for purifying polluted liquids, especially water. The apparatus comprises a vessel with a relatively large length to width ratio including a reaction zone for contacting the liquid with a gas, separated from the rest of the vessel by a downflow-upflow wall, having a liquid inlet means for introducing a liquid into the reaction zone, the flotation zone connected with the reaction zone occupying the rest of the vessel and a skimmer disposed at the end of the flotation zone for skimming off the floating materials to a channel arranged transverse to the longitudinal axis of the vessel and means for removing the purifying liquid from the apparatus.

7 Claims, 3 Drawing Figures

(I-I)

APPARATUS FOR PURIFYING POLLUTED LIQUIDS

This is a continuation of application Ser. No. 74,753, filed Sept. 12, 1979, now abandoned.

BACKGROUND OF THE INVENTION

Flotation separators are known in the art. They are useful for the mechanical separation of suspended materials, emulsifiers and colloids which can float and which are found in the water being treated. The materials are conveyed to the surface of a liquid as a result of interaction with a gas. The operation is designated as flotation.

The known apparatuses either use expansion flotation or introduce the gas into the liquid by means of special discharge nozzles or by means of electrolysis.

In the apparatus that uses expansion flotation, a portion of the liquid prior to flowing into the collecting tank is enriched with air under high pressure and mixed with the main liquid stream. When the liquid is introduced into the flotation tank, small bubbles are formed as a result of the sudden reduction in pressure, the small air bubbles interact with the flotable materials so that they are conveyed upwards to the surface. The liquid flowing from the discharge end of the tank forms a main throughput current which conveys the floating mass on the surface of a liquid past the downflow-upflow wall, to the skimmer which skims off the floating mass into a skim channel where it is collected and discharged.

However, this apparatus has the disadvantage that the liquid passes straight through the apparatus and only a one-time contact with the gas occurs. No circulation of the liquid occurs nor is it intended. Therefore, the downflow-upflow wall of the appartus is as a rule shut off at the bottom. The only current is the main throughput current that conveys the floating mass to the skimmer. As a consequence, the liquid is not thoroughly treated, and leaves the tank still charged with impurities. The construction and operation of the apparatus are very costly.

In an apparatus in which the gas contact is effected by means of discharge nozzles, no circulation of liquid and repeated gas contact takes place. The air is introduced into the liquid in the form of small bubbles through small apertures in the walls of the nozzles generally fabricated from sintered material. The formation of the very fine bubbles at first favors the flotation. As time passes, the fine discharge apertures become obstructed and the liquid is not intimately contacted with any gas. In this apparatus, there is the danger that a large portion of the materials are not precipitated.

The present invention is directed to an apparatus of the type mentioned above which can achieve a more thorough treatment of a liquid. The present invention provides a current of liquid that is repeatedly contacted with the gas and at the same time enables the flotable materials in the liquid to be floated and the heavy materials to settle. The fabrication and operation of the apparatus are economical and in addition, the apparatus can be regulated with regard to the rate of flow, height of the liquid level, and portion of portion of water in the skimmed floating mass. Furthermore, the apparatus is useful for the flotation of materials capable of floating and for precipitation of materials that form sediments. In addition, the apparatus can be used for neutralizing solutions and flocculating colloidally dispersed materials and emulsifiers.

BRIEF SUMMARY OF THE INVENTION

According to the present invention, in a flotation apparatus of the type described above characterized that for contacting the liquid with a gas, a high-speed ejector aerator having a drive shaft extending below the level of the liquid with mixing means at the lower end and gas or air feeding means, is arranged in the reaction zone in a manner such that circulation of the liquid is induced and repeated contact with the gas takes place in the reaction zone. In addition to the main throughput current that flows from the inlet through the reaction zone past the downflow-upflow wall to the skim channel and the spillway, a current is formed in the longitudinal direction of the container which circulates the liquid away from the reaction zone at the surface of the liquid and returns the liquid to the reaction zone at a lower area of the liquid. The floatable impurities form a floating mass and the heavy contaminants sink.

In the apparatus according to the present invention, the conventional methods for introduction of the flotation bubbles are replaced by a high-speed ejector aerator such as disclosed, for example, in German Pat. No. 1,782,485. Aerators of this type produce fine gas bubbles by inducing gas contact with the liquid in the vicinity of the propeller hub and intensive intimate contact between the liquid and gas in the vicinity of the mixing blades. A large contact surface between the liquid, the gas bubbles and the floatable material is provided and the floatable material is conveyed to the surface of the liquid.

The high-speed ejector aerator provides a high circulation rate for a short circulation period that tends to prevent settling of solids suspended in the liquid so that only rapidly settling materials of high specific gravity, such as sand, can settle on the bottom of the tank of the reaction zone.

In the turbulence in the propeller area of the high-speed ejector aerator, agglomerates of materials capable of floating and settling such as sand and fat are separated, thus making precipitation possible for the first time.

BRIEF DESCRIPTION OF THE DRAWINGS

The invention is diagrammatically illustrated in the drawings with reference to an example.

Figure 1:
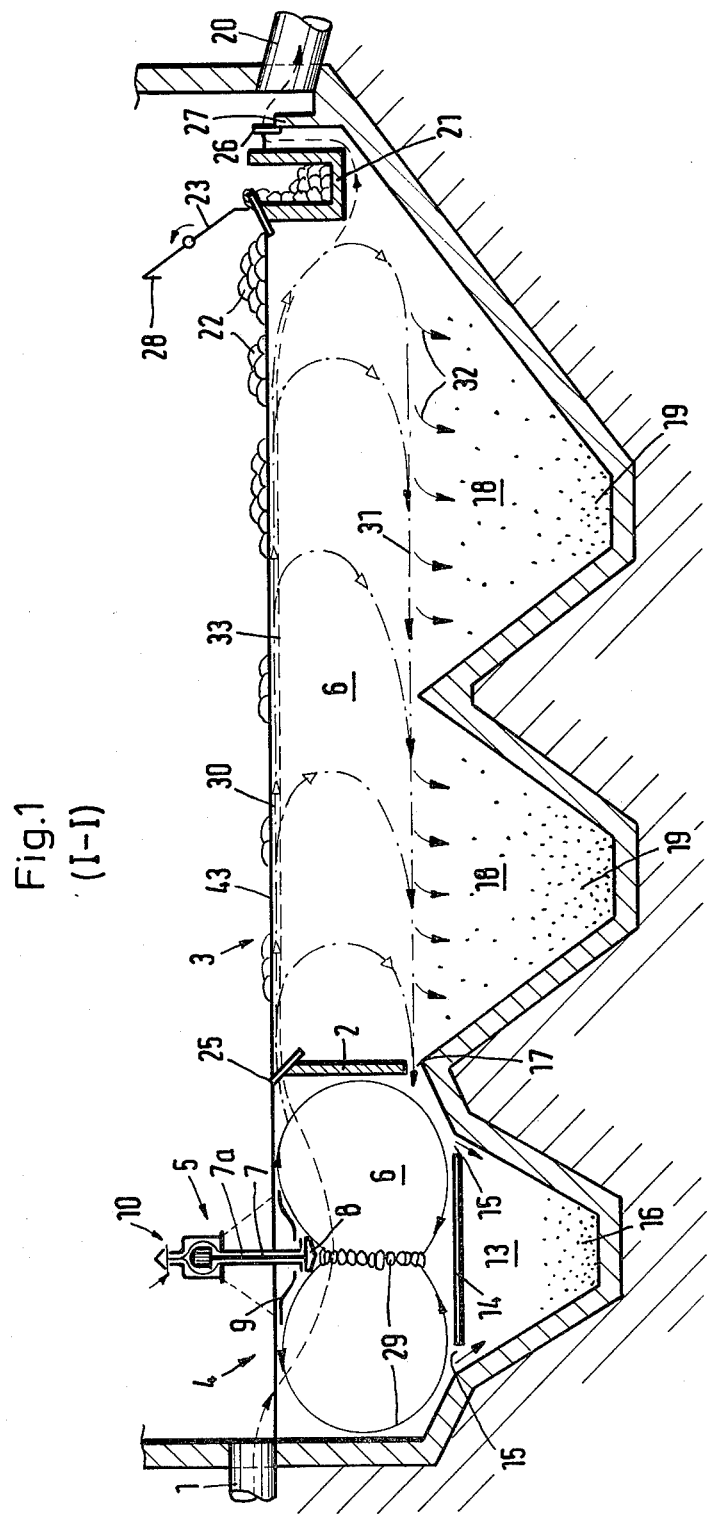
Figure 2:
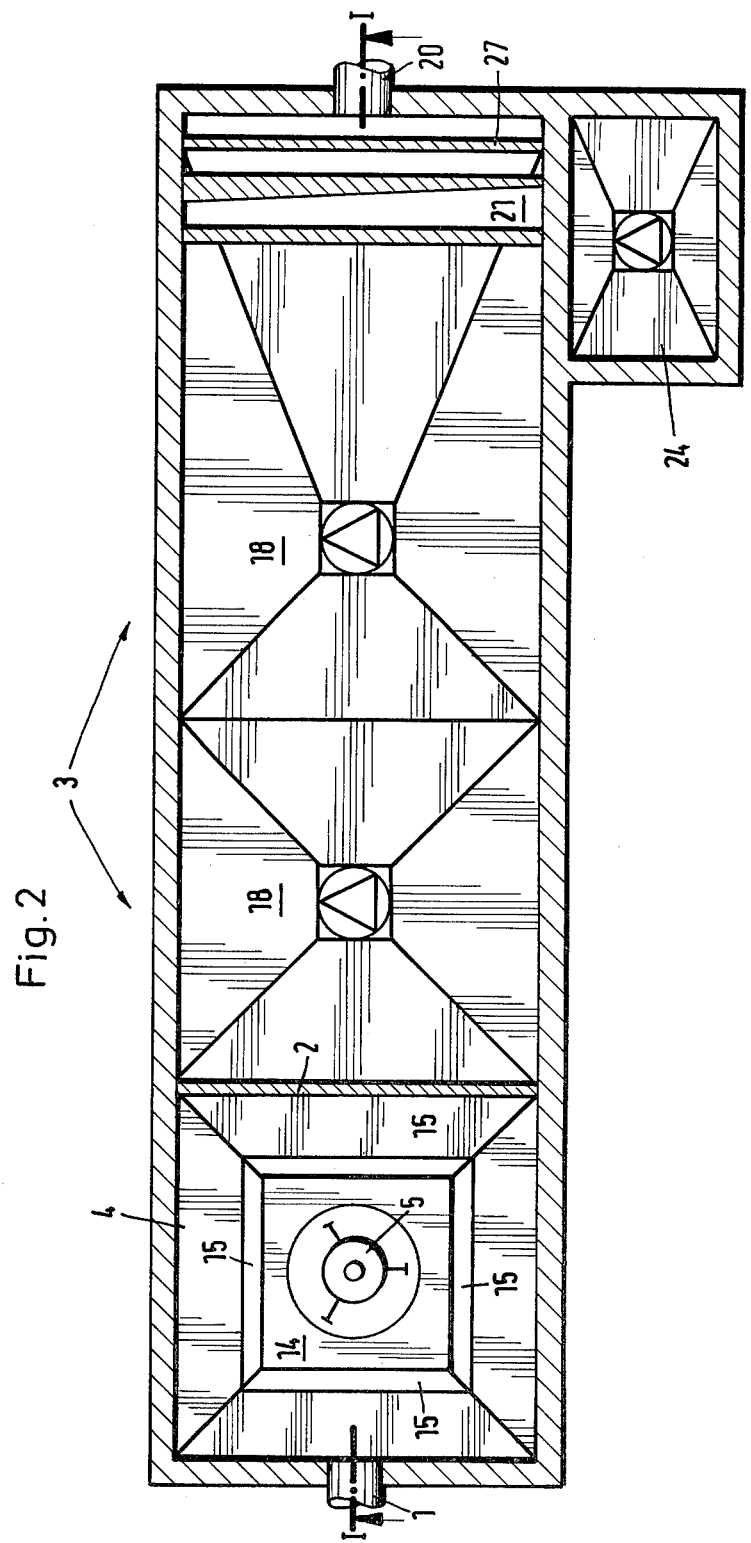

IN THE DRAWINGS:

FIG. 1 is a longitudinal section along line I—I of FIG. 2 showing the different currents in the liquid and a high-speed ejector aerator with the air induced past the motor.

FIG. 2 is a top view of the apparatus according to the present invention shown in FIG. 1 without liquid.

Figure 3:
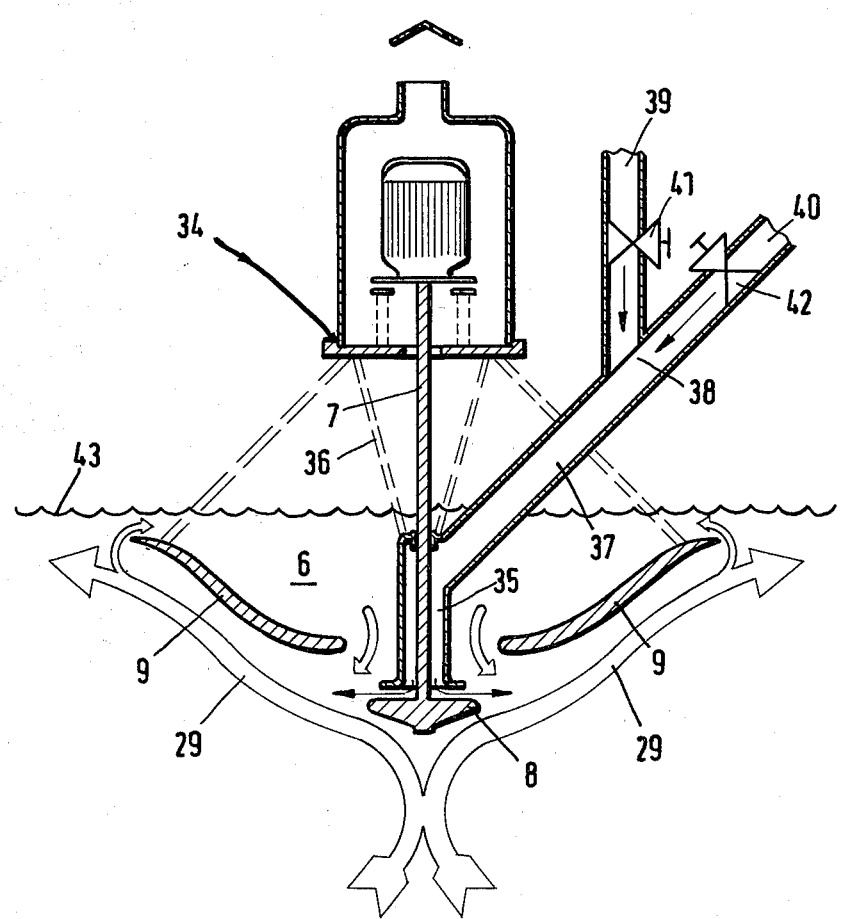

FIG. 3 is a vertical section through a high-speed ejector aerator useful in the present invention.

DETAILED DESCRIPTION OF THE INVENTION

In a more advantageous embodiment of the invention, a funnel shaped sand trap covered with a regulating plate is arranged at the bottom of the first reaction zone whereby the turbulence produced by the ejector aerator is absorbed. The regulating plate is arranged to form between its edge and the wall of the sand trap a space through which the sand particles can reach the sand trap.

The ejector aerator disposed in the apparatus in the first reaction zone causes a circulating movement of the liquid and a circulating current is formed which flows at the liquid surface over the downflow-upflow wall toward the discharge end of the tank, said current flowing back countercurrent to the surface current in the lower levels of the liquid into the first reaction zone. A clearance is left between the lower edge of the downflow-upflow wall and the bottom of the vessel to permit the liquid to return to the first reaction zone. The circulating current returns the liquid to be treated into the first reaction zone where it can be contacted with the gas by the ejector aerator. The floatable materials in the liquid being treated are provided several opportunities for separating as a floating mass in the region between the downflow-upflow wall and the skimmer, on the surface of the liquid, while the materials that settle are enabled to separate from the current near the bottom and settle on the bottom of the vessel. Therefore, the current described acts as a flotation and sedimentation current.

To achieve a still better reflection of the current from the first reaction zone into the rest of the vessel, the vertical edges of the head end of the apparatus can be somewhat rounded.

According to another advantageous embodiment of the invention, the bottom of the vessel of the apparatus in the area outside the first reaction zone is constructed as one or more funnel-shaped upwardly enlarging settling zones where the high specific gravity materials from the sedimentation current that settle can deposit.

In another advantageous embodiment of the invention, the velocity of the flotation and sedimentation current of the liquid can be controlled by a regulating plate vertically adjustable adjacent to the upper edge of the downflow-upflow wall.

Besides the flotation and sedimentation current produced by the ejector aerator, there also exists another current in the area of the surface of the liquid in the apparatus, namely, the main throughput current. This current starts at the inlet, passes through the reaction zone, over the downflow-upflow wall and under the skim channel to the spillway edge. The main throughput current transports the floating mass that forms on the flotation current to the skimmer and effects above all the throughput of the liquid being treated through the apparatus.

The volume and cross section of the apparatus is in general dimensioned so that the velocity of the main throughput current is small in comparison to the velocity of the flotation and sedimentation current.

According to another advantageous embodiment of the invention, a vertically adjustable regulating plate is arranged in cooperation with the spillway edge to control the height of the water level in the apparatus. By means of the regulating plate, it is possible to adjust the height of the liquid level in the apparatus and simultaneously the liquid level in relation to the skim plate arranged on the wall of the skim channel below the skimmer. The regulating means is essential to control the portion of water in the floating mass skimmed by the skimmer.

According to another advantageous embodiment of the invention, the skimmer has adjustable rubber aprons whereby the amount of the material skimmed from the surface can be controlled.

The ejector aerator can advantageously possess a suction or induction pipe disposed around the drive shaft through which air can be induced to flow around or through the motor. The suction pipe is arranged in cooperation with the ducts formed in the mixing blades, said ducts discharging into the free outer edges of the deflection bridges between the blades of the mixing means.

According to another embodiment of the present invention, the high speed ejector aerator of the apparatus according to the present invention can also be connected by means of a pipeline and pipe branches with lines for different gases, said lines being provided with regulating means for control of gas flow. In this type of contactor, the gas is laterally dispersed through a suction head built under water around the mixing blades. The suction head is held by a basket-like structure and is provided with a small annular slot to prevent liquid from flooding the suction head. Small amounts of water which may enter the suction head cool both the seal of the suction head and the gas whereby undesirable temperature effects may be avoided. This type of contactor is preferably suited for absorption of smoke containing gas, for neutralization and for contacting the liquid with ozone and other reactive gases such as chlorine or ammonia so that the gases are reacted to the highest degree.

It is also advantageous in this aerator or contactor design that different gaseous components can be controlled by simple regulating mechanisms such as magnet valves or the like. The proportions of air, ozone, smoke containing gas and other gaseous process components can be changed readily so that it is possible to carry out different operations in the waste water.

The apparatus according to the invention can be used to advantage for the flotation of suspended materials, emulsifiers and colloids.

The apparatus, is suited to chemically neutralize alkaline solutions and acids. In many cases an intensive flotation of components to be eliminated such as dyes, albumin derivatives and the like occurs simultaneously with the chemical reaction.

The apparatus of the present invention requires only about 25% of the operating costs of apparatuses where known processes such as expansion flotation are used. The apparatus is economically constructed and is more thorough in the treatment of appropriate waste waters, especially waste waters containing emulsified fats. In the apparatus of the present invention, flocculation operations are advantageously assisted and partly brought about by breaking emulsions and packing together finely divided dispersed materials.

In FIG. 1 is shown in section an example of an apparatus according to the present invention. The polluted liquid enters through inlet 1 into a first reaction zone 4 separated from the elongated rectangular tank 3 by a downflow-upflow wall 2. In the example shown, in the center of the reaction zone 4 is arranged a highspeed ejector aerator 5, with an approximately perpendicular drive shaft 7, immersed in the liquid 6, having secured at the lower end the mixing means 8 and a dish-shaped conducting means 9. The aerator 5 has a drive shaft 7 and disposed around it is a suction pipe into which air 10 is induced to flow past the motor. The cavity 7a of the suction pipe is connected at the lower end to a duct formed in the mixing propeller 8, said duct discharging in the free outer edge of the deflecting bridge between the blades of the mixing propeller 8.

The tank bottom in the area of the reaction zone 4 is in the form of a funnel shaped settling zone 13 for collecting rapidly settling materials such as sand 16. The top funnel-shaped opening of the settling zone 13 is covered with a regulating plate 14 disposed in a manner to leave between the edge of the plate 14 and the wall of the settling zone 13 a surrounding clearance 15 through which sand 16 or other high density materials can enter the settling zone 13.

The downflow-upflow wall 2 which separates the reaction zone 4 from the rest of the tank 3 is arranged to form, between the tank bottom and the lower edge of the wall, over the entire width of the tank 3, a clearance 17 so that the liquid circulating currents near the bottom can enter the reaction zone 4.

The tank bottom outside the reaction zone 4 is built in the form of several adjacent funnel-shaped upwardly enlarging settling zones 18 for the materials that settle and form slurry 19.

At the end of the tank 3, opposite the inlet end, transversely to the longitudinal axis of the tank and facing the spillway 20 of the tank 3, is disposed a skim channel 21 which slopes toward a collecting zone 24, for fat and floating materials, disposed laterally next to the tank 3. The fat and floating materials are skimmed from the surface 43 of the liquid 6 in the form of the floating mass 22 by means of a skimmer 23 mounted parallel and in front of the channel 21.

To control the velocity of liquid 6 flowing in the apparatus according to the invention, a vertically adjustable regulating plate 25 is superposed on the downflow-upflow wall 2 to insure a more or less uniform velocity of flow across the width of the vessel.

To control the level of liquid in tank 3, a vertically adjustable regulating plate 26 is arranged in the spillway edge 27.

The skimmer 23 is provided with adjustable aprons 28 for controlling the proportion of water skimmed with the floating mass 22.

In FIG. 1 are diagrammatically shown the different currents produced by the high-speed ejector aerator 5 in the liquid 6 in tank 3. The ejector aerator 5 produces in reaction zone 4 circulation and intensive turbulence 29 in the liquid 6. Starting from the reaction zone 4 a flotation current 30 is produced in the area of the liquid surface 43 which flows over the downflow-upflow wall 2 toward the opposite end of tank 3. The floating mass 2 forms over the whole length of said current and is transported to the skimmer 23. In proximity to the tank bottom, the sediment current 31 flows countercurrent to flotation current 30 under the downflow-upflow wall 2 into the reaction zone 4. From said current 31, the materials that form sediment 32 sink into settling pockets 18 situated on the bottom of the tank 3. In addition to said currents produced by the high-speed ejector aerator 5, the main throughput current 33 shown as the dashed line in FIG. 1, flows from the inlet 1 to the outlet of the apparatus. The main throughput current starts at the inlet 1 at the head end of the tank 3, passes through the reaction zone 4, over the downflow-upflow wall 2 and under the skim channel 21 to the spillway edge 27. The main throughput current takes part in transportation to the skimmer of the floating mass 22 that forms on the flotation current and is determined by the amount of liquid being treated in the apparatus.

In FIG. 2 is a diagrammatically shown, viewed from above, a horizontal section through tank 3 of the apparatus of the invention shown in FIG. 1. The section shows the elongated shape of the rectangular vessel 3. The reaction zone 4 separated by the downflow-upflow wall 2 has an approximately square cross section. The bottom of the reaction zone 4 is shaped like a funnel to form the sand trap 13. The sand trap 13 is in turn covered by the regulating plate 14 in a manner such as to form a narrow surrounding intermediate space 15. Above the regulating plate 14 is diagrammatically shown the high-speed ejector aerator 5 arranged in the center of the reaction zone 4. The tank bottom outside the reaction zone 4 is formed by two funnel-shaped settling zones 18 of which the one arranged directly adjacent the downflow-upflow wall 2 has an approximately square cross section. Near the end of the tank 3 opposite the inlet 1 is situated the skim channel 21 connected with the collecting zone 24 for fat and floating materials. Behind the skim channel 21 is the spillway edge 27 and the spillway proper 20.

In FIG. 3 is diagrammatically shown in cross section a high-speed ejector aerator in the form of a contactor 34. In this contactor the gas is forced laterally through suction head 35 arranged under the liquid level around the mixing means 8. The suction head is supported by a basket-like structure 36. By means of pipeline 37 and pipe branch 38, the suction head 35 is connected to an air and gas line 39 or 40 respectively which are provided with regulating means such as valves 41 or 42.

What is claimed is:

1. In an apparatus for treating contaminated liquids, especially water, comprising an oblong vessel having a pair of opposed sides, a pair of opposed ends, and a bottom, a partition separating a reaction zone and a flotation zone, means disposed in said reaction zone for contacting the liquid with a gas, inlet means for feeding the liquid to said reaction zone, said flotation zone being in communication with said reaction zone and occupying the major portion of the vessel, a channel disposed at the end of said flotation zone remote from said reaction zone and disposed transverse to the longitudinal axis of the vessel, skimming means disposed at the end of said flotation zone for skimming floating material into said channel, and a spillway with a spillway edge situated behind said channel, the improvement which comprises:

(a) that portion of said vessel bottom disposed below said reaction zone being funnel-shaped, thereby defining a quiescent settling zone for collecting rapidly settling materials, the upper opening of said funnel-shaped settling zone being covered by a regulating plate disposed to form a surrounding clearance between the plate edge and the wall of the settling zone to permit the settling material to enter the settling zone, said regulating plate preventing turbulence in the reaction zone from resuspending the particles in the settling zone;

(b) that portion of said vessel bottom disposed below said flotation zone being formed such as to define at least one funnel-shaped additional quiescent settling zone adjacent to said first-mentioned settling zone, the upper edges of the walls of said adjacent settling zones forming an inverted substantially V-shaped floor portion;

(c) said partition being disposed above said inverted V-shaped floor portion with a gap therebetween, and extending to near the surface of the liquid in said apparatus; and (d) a high-speed ejector aerator having mixing means arranged in said reaction zone with said mixing means immersed in the liquid to provide intensive contact between a gas and the liquid, to provide intensive turbulence in the liquid in said reaction zone, and to provide forced surface flow from said reaction zone to said flotation zone and forced recirculation flow from said flotation zone to said reaction zone;

(e) whereby circulation and intensive turbulence are caused in said reaction zone, a flotation current is produced in the area of the liquid surface flowing over said partition toward said skimming means thereby transporting the resultant floating mass of flotable contaminants to said skimmer, a main throughput current is produced flowing from said inlet, through said turbulence, over said partition, along the upper portion of said flotation zone, and to said spillway, and causing a sediment current flowing counter to the direction of said flotation current along the lower portion of said flotation zone, but above said additional settling zone, and under said partition into said reaction zone.

2. An apparatus according to claim 1, wherein a vertically adjustable regulating plate is arranged to cooperate with the top of the partition to control the velocity of the liquid across the width of the apparatus.

3. An apparatus according to claim 1, wherein a vertically adjustable regulating plate is arranged on the spillway edge to control the level of the liquid level in the vessel.

4. An apparatus according to claim 1 wherein the skimmer is provided with adjustable aprons to control the proportion of water in the floating mass.

5. An apparatus according to claim 1 wherein the high speed ejector aerator has a hollow drive shaft or a suction pipe around the drive shaft for the supply of gas.

6. An apparatus according to claim 1, wherein the gas-feeding means of the ejector aerator is connected to branched pipelines for introduction of different gases into the liquid being treated.

7. An apparatus according to claim 1, wherein the apparatus is used for neutralizing alkaline or acid solutions.

* * * * *

UNITED STATES PATENT AND TRADEMARK OFFICE
CERTIFICATE OF CORRECTION

PATENT NO. : 4,330,403

DATED : May 18, 1982

INVENTOR(S) : Hubert Fuchs

It is certified that error appears in the above—identified patent and that said Letters Patent is hereby corrected as shown below:

Column 5, line 44: change "2" to read --22--

Signed and Sealed this

Twenty-second Day of March 1983

[SEAL]

Attest:

GERALD J. MOSSINGHOFF

*Attesting Officer*     *Commissioner of Patents and Trademarks*